United States Patent [19]

Scheiman

[11] Patent Number: 5,649,366
[45] Date of Patent: Jul. 22, 1997

[54] POWER SAW ALIGNMENT DEVICE

[76] Inventor: David J. Scheiman, 1436 N. Cedar Rd., New Lenox, Ill. 60451-1109

[21] Appl. No.: 540,007

[22] Filed: Nov. 6, 1995

[51] Int. Cl.⁶ ................................................ B23D 51/02
[52] U.S. Cl. ................................ 30/374; 30/371; 83/745
[58] Field of Search .......................... 30/289, 371, 372, 30/374, 376; 83/745

[56] References Cited

U.S. PATENT DOCUMENTS

| | | | |
|---|---|---|---|
| 3,903,774 | 9/1975 | Stinson | 83/745 |
| 4,602,435 | 7/1986 | Nishioka | 30/372 |
| 4,777,726 | 10/1988 | Flowers | 30/374 |
| 4,790,072 | 12/1988 | Edwards | 30/376 |
| 5,084,977 | 2/1992 | Perkins | 30/374 |

*Primary Examiner*—Hwei-Siu Payer

[57] ABSTRACT

An alignment device for guiding a power saw orthogonally across a board. The inventive device includes a base plate securable along side a support deck of a saw. An alignment member is movably mounted along the base plate and oriented so as to extend orthogonally relative to a blade of the saw. Spring return assemblies bias the alignment member towards a front end of the base plate and against an edge of a board to position the saw in an orthogonal orientation relative to the edge to ensure a straight cut across the board.

9 Claims, 3 Drawing Sheets

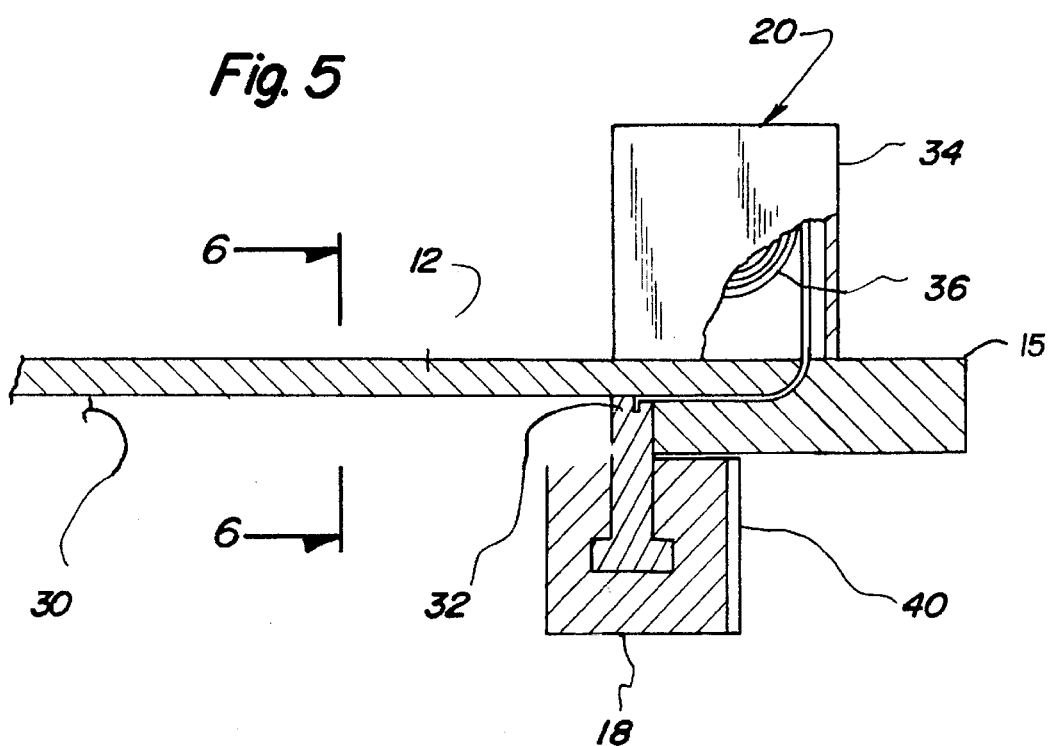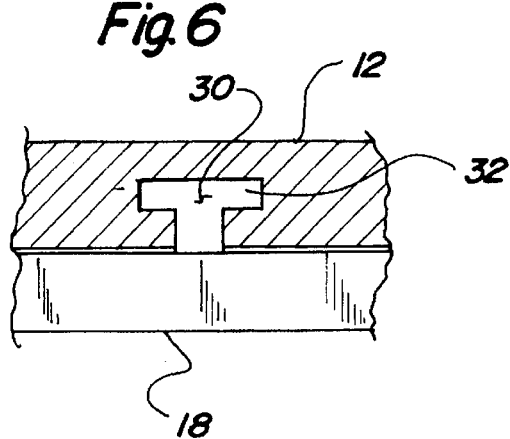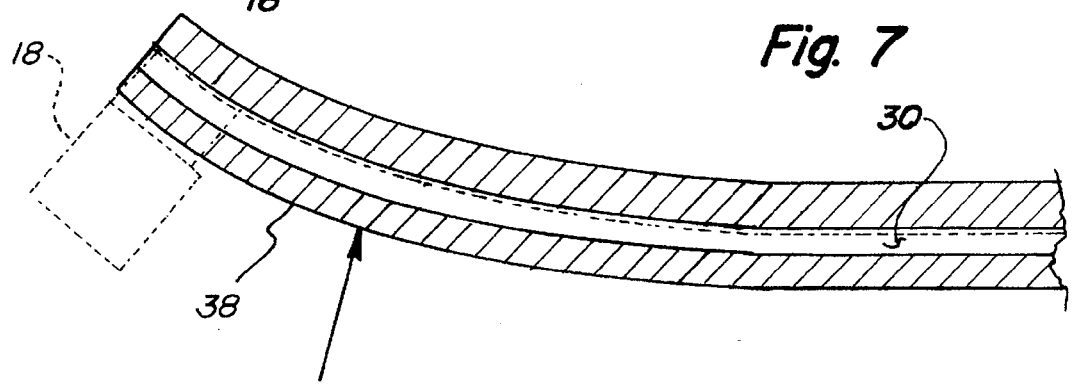

POWER SAW ALIGNMENT DEVICE

BACKGROUND OF THE INVENTION

1. Field of the Invention

The present invention relates to tool guides and more particularly pertains to a power saw alignment device for guiding a power saw orthogonally across a board.

2. Description of the Prior Art

The use of tool guides is known in the prior art. More specifically, tool guides heretofore devised and utilized are known to consist basically of familiar, expected and obvious structural configurations, notwithstanding the myriad of designs encompassed by the crowded prior art which have been developed for the fulfillment of countless objectives and requirements.

Known prior art tool guides include U.S. Pat. No. 5,271,159; U.S. Pat. No. 5,206,999; U.S. Pat. No. 4,095,632; U.S. Pat. No. 5,213,020; U.S. Pat. No. 4,854,207; and U.S. Pat. No. 4,016,649.

While these devices fulfill their respective, particular objectives and requirements, the aforementioned patents do not disclose a power saw alignment device for guiding a power saw orthogonally across a board which includes a base plate securable along side a support deck of a saw, an alignment member movably mounted along the base plate and oriented so as to extend orthogonally relative to a blade of the saw, and spring return assemblies biasing the alignment member towards a front end of the base plate and against an edge of a board to ensure a straight cut across the board.

In these respects, the power saw alignment device according to the present invention substantially departs from the conventional concepts and designs of the prior art, and in so doing provides an apparatus primarily developed for the purpose of guiding a power saw orthogonally across a board.

SUMMARY OF THE INVENTION

In view of the foregoing disadvantages inherent in the known types of tool guides now present in the prior art, the present invention provides a new power saw alignment device construction wherein the same can be utilized for guiding a power saw orthogonally across a board. As such, the general purpose of the present invention, which will be described subsequently in greater detail, is to provide a new power saw alignment device apparatus and method which has many of the advantages of the tool guides mentioned heretofore and many novel features that result in a power saw alignment device which is not anticipated, rendered obvious, suggested, or even implied by any of the prior art tool guides, either alone or in any combination thereof.

To attain this, the present invention generally comprises an alignment device for guiding a power saw orthogonally across a board. The inventive device includes a base plate securable along side a support deck of the saw. An alignment member is movably mounted along the base plate and oriented so as to extend orthogonally relative to a blade of the saw. Spring return assemblies bias the alignment member towards a front end of the base plate and against an edge of a board to position the saw in an orthogonal orientation relative to the edge to ensure a straight cut across the board.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power saw alignment device apparatus and method which has many of the advantages of the tool guides mentioned heretofore and many novel features that result in a power saw alignment device which is not anticipated, rendered obvious, suggested, or even implied by any of the prior art tool guides, either alone or in any combination thereof.

It is another object of the present invention to provide a new power saw alignment device which may be easily and efficiently manufactured and marketed.

It is a further object of the present invention to provide a new power saw alignment device which is of a durable and reliable construction.

An even further object of the present invention is to provide a new power saw alignment device which is susceptible of a low cost of manufacture with regard to both materials and labor, and which accordingly is then susceptible of low prices of sale to the consuming public, thereby making such power saw alignment devices economically available to the buying public.

Still yet another object of the present invention is to provide a new power saw alignment device which provides in the apparatuses and methods of the prior art some of the advantages thereof, while simultaneously overcoming some of the disadvantages normally associated therewith.

Still another object of the present invention is to provide a new power saw alignment device for guiding a power saw orthogonally across a board.

Yet another object of the present invention is to provide a new power saw alignment device which includes a base plate securable along side a support deck of a saw, an alignment member movably mounted along the base plate and oriented so as to extend orthogonally relative to a blade of the saw, and spring return assemblies biasing the alignment member towards a front end of the base plate and against an edge of a board to ensure a straight cut across the board.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 2.

FIG. 6 is a cross sectional taken along line 6—6 of FIG. 5.

FIG. 7 is a cross sectional view taken along line 7—7 of FIG. 2.

DESCRIPTION OF THE PREFERRED EMBODIMENT

Figure 1:
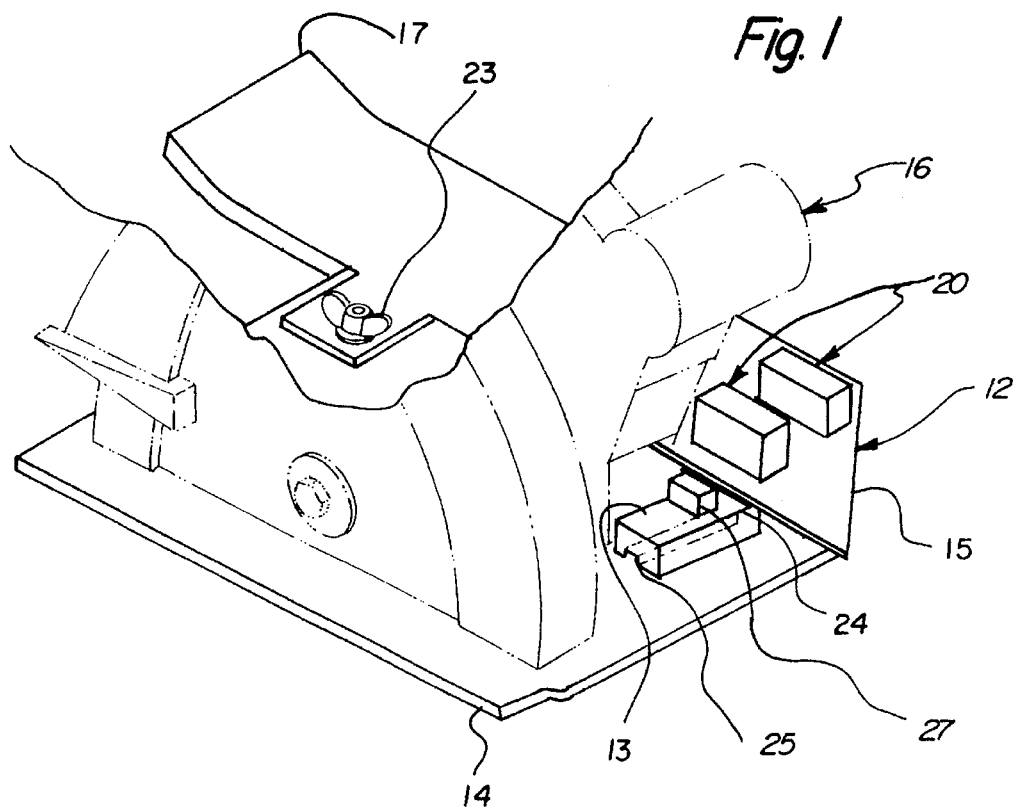
FIG. 1 is an isometric illustration of a power saw alignment device according to the present invention as secured to a power saw.

With reference now to the drawings, and in particular to FIGS. 1–7 thereof, a new power saw alignment device embodying the principles and concepts of the present invention and generally designated by the reference numeral 10 will be described.

Figure 2:
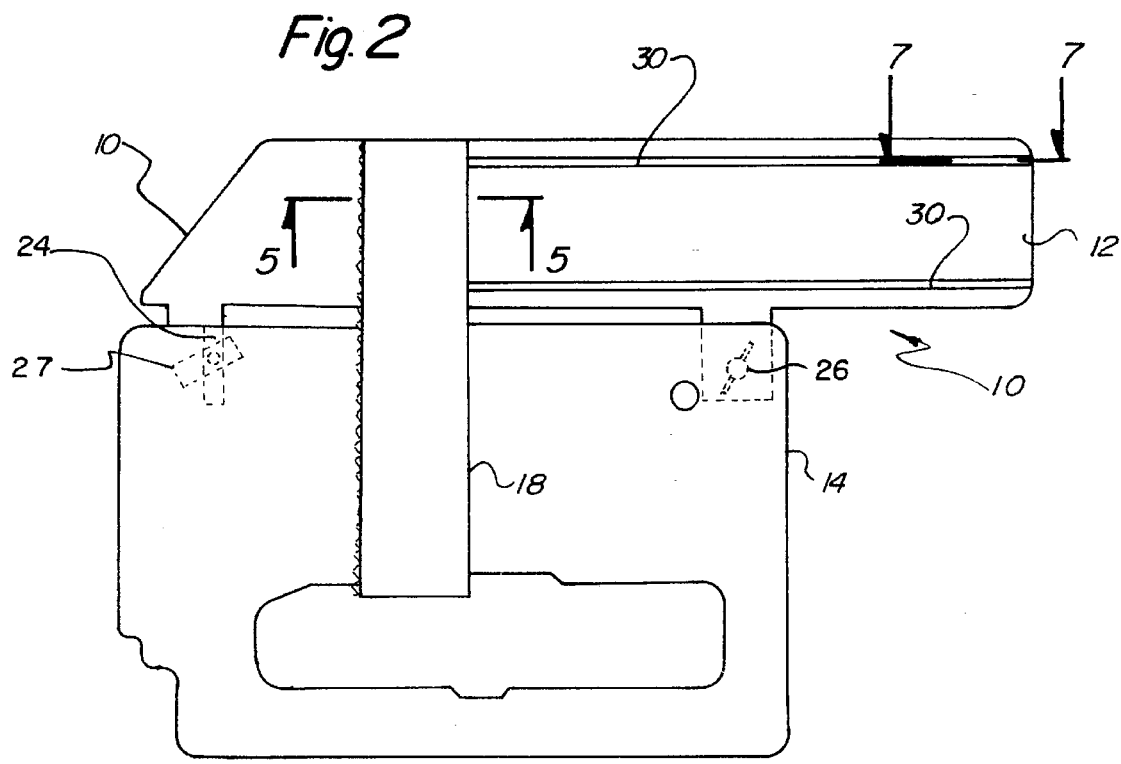
FIG. 2 is a bottom plan view of the invention as shown in FIG. 1.
Figure 3:
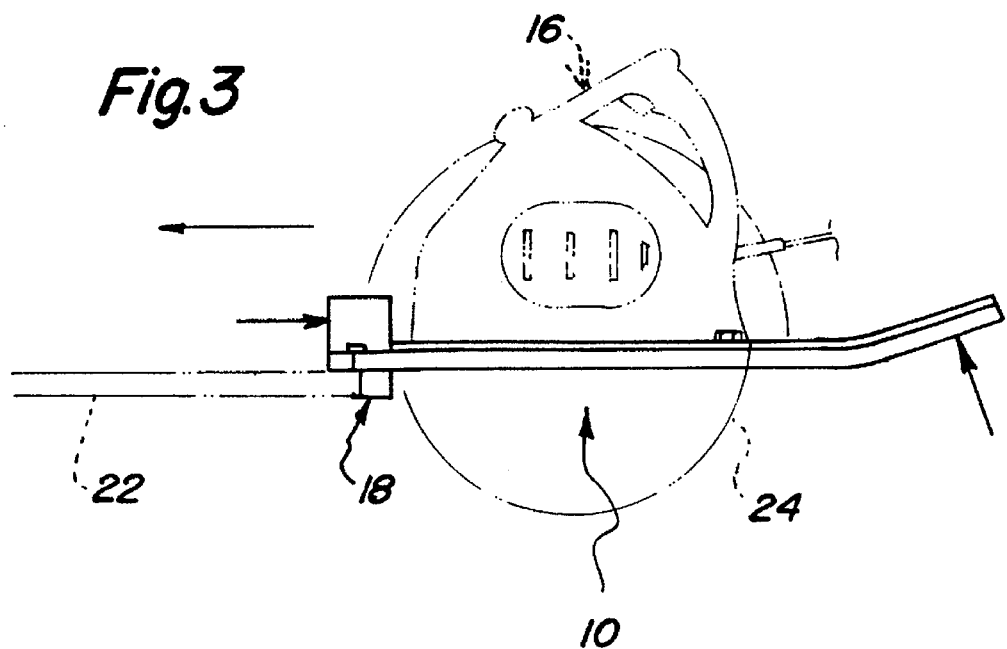
FIG. 3 is a side elevation view of the device in use.
Figure 4:
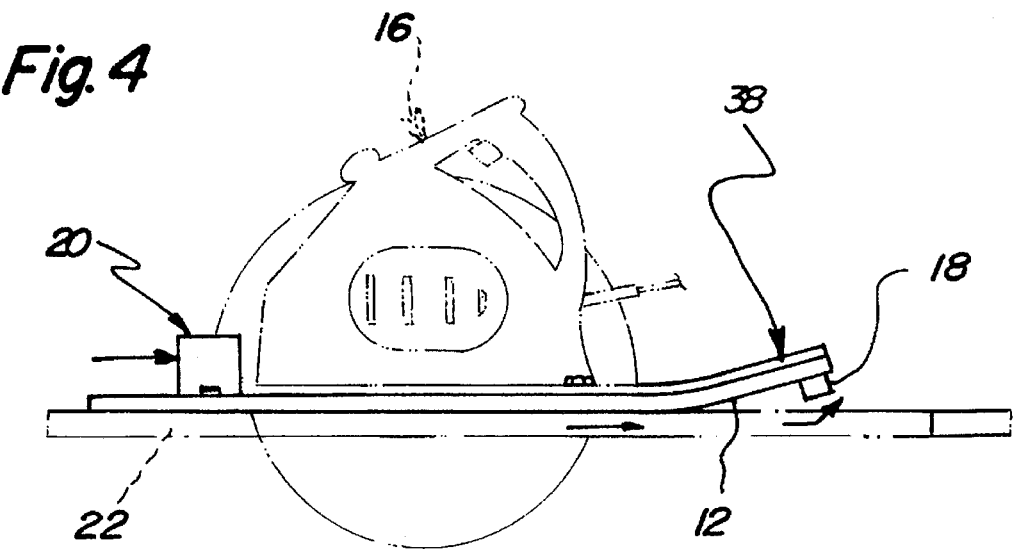
FIG. 4 is a further side elevation of the device in use.

More specifically, it will be noted that the power saw alignment device 10 comprises a base plate 12 of substantially planar configuration which can be secured to an upper surface of a support deck 14 of a conventionally known power saw 16 as shown in FIG. 1 of the drawings. The support deck has a rip guide 13 fixedly attached. The base plate 12 is characterized as being substantially elongated in shape and including a forward end 15 spaced from an rearward end 17. The base plate 12 having a longitudinal axis extending through the forward and stopping just before the rearward end thereof. An alignment member 18 is movably mounted to a lower surface of the base plate 12 and includes an alignment member front face oriented so as to extend substantially orthogonally relative to the longitudinal axis of the base plate 12. At least one spring return assembly 20 is coupled to the base plate 12 and to the alignment member 18 so as to bias the alignment member 18 towards the forward end of the base plate 12. FIG. 2 of the drawings shows the alignment member near the forward end. By this structure, the alignment member 18 can be engaged to an edge of a board 22, as shown in FIG. 3 of the drawings, so as to orient a blade 21 in a substantially orthogonal orientation relative to the edge of the board 22. The alignment member 18, as shown in FIG. 4, can be biased towards the rearward end of the base plate 12 as the saw 16 is moved across the board 22 to eventually reside near the rearward end of the base plate 12 such that a board 22 having a transverse width greater than a longitudinal length of the base plate 12 can be continuously cut.

As shown in FIGS. 1 and 2, the base plate 12 of the present invention 10 is preferably coupled to the support deck of the power saw 16. The base plate 12 is coupled by a fastener 23 directed therethrough, and a base plate insert 24 that is positioned within a rip guide slot 25 of the rip guide 13 positioned adjacent the top of the support deck. The fastener is received within countersunk apertures 26 extending into the base plate 12 so as to accommodate the fastener in a recessed orientation. The base plate insert 24 is extending into the rip guide slot 25 and held in position with the rip guide by the rip guide nut 27. The base plate 12 is of a predetermined thickness and therefore supports the support deck 14 above the board 22 being cut. Typically, a support deck 14 of a power saw 16 will extend along opposed sides of the blade 24 thereof.

As best illustrated in FIGS. 2 and 5 through 7, it can be shown that the base plate 12 is shaped so as to define a plurality of guide slots 30 directed into a bottom surface thereof and oriented so as to extend substantially parallel to the longitudinal axis of the base plate 12. A guide projection 32 extending from the alignment member 18 is cooperatively configured relative to the guide slots 30 and received therewithin so as to movably mount the alignment member 18 along the lower surface of the base plate 12. By this structure, the alignment member 18 is permitted to move in a direction parallel to the longitudinal axis of the base plate 12 and beyond the stopping point of the axis, while simultaneously being maintained in the substantially orthogonally orientation relative to the base plate.

As best illustrated in FIG. 5, it can be shown that each of the spring return assemblies 20 preferably comprises a spring housing 34 mounted relative to the base plate 12 and supporting a spiral spring 36 therewithin. The spiral spring 36 extends into the guide slot 30 through an unlabeled spring slot and is coupled to the guide projection 32 of the respective guide slot. The spiral spring 36 is preferably pre-tensioned so as to pull the alignment member 18 towards the front end 15 of the base plate 12 as shown in FIG. 5 of the drawings. If need be the spiral spring will allow the alignment member to move towards the rear end of the base plate when needed to allow cutting of boards that have a transverse width greater than the longitudinal length of the base plate. In most instances the spiral spring continuously pulls the alignment member toward the front end in counter reaction to the pull on the blade as it cuts through the board. By this structure, the alignment member 18 is continuously biased against the edge of the board 22 being cut as shown in FIG. 3 of the drawings. Placing the alignment member biased against the edge of the board and the spring pulling it toward the front end simultaneously, ensures that the saw blade will cut straight lines perpendicular to the stock.

To permit positioning of the alignment member 18 near the rear end of the base plate 12 as shown in FIGS. 4 and 7, the base plate 12 is desirably shaped so as to include an arcuate rear edge 38 extending along the rearward end of the base plate, with the guide slots 30 curving upwards proximal to the arcuate rear edge 38 and terminating just beneath an upper surface of the base plate 12. The arcuate rear edge of the base plate moves the base plate out of the way of the saw blade as it travels toward the end of the board 22. By this structure, the guide projection 32 and the associated alignment member 18 are permitted to swing about the arcuate rear edge 38 so as to reside near the rearward end of the base plate 12 during use of the device 10 as is illustrated in FIG. 4 of the drawings.

As best illustrated in FIGS. 2 and 5, it is desirable for the alignment member 18 to be provided with a plurality of gripping projections 40 extending from a forward or engaging surface thereof which engage the edge of the board 22 so as to discourage lateral movement of the saw 16 during cutting of the board.

In use, the power saw alignment device 10 according to the present invention can be easily utilized to effect orthogonal cutting of a board 22 relative to an edge thereof. The alignment member 18, because of the shape of the arcuate rear edge 38 is permitted to slide rearwardly of the base plate 12 such that cutting of boards having a transverse width greater than the base plate 12 can be accomplished in a single cut.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power saw in combination with the alignment device comprising:

a base plate of substantially planar configuration secured to an upper surface of a support deck of the power saw, the base plate being substantially elongated in shape and including a forward end spaced from a rearward end with along a longitudinal axis extending through the forward end and inclining just before the rearward end thereof:

an alignment member movably mounted to a lower surface of the base plate and including an alignment member front face oriented so as to extend substantially orthogonally relative to the base plate;

a spring return assembly coupled to the base plate and to the alignment member so as to bias the alignment member towards the forward end of the base plate and the spring return assembly allows the alignment member to be pulled towards the rearward end of the base plate, wherein the alignment member can be engaged to an edge of a board so as to orient a blade of the saw in a substantially orthogonal orientation relative to the edge of the board; and the base plate is shaped so as to define a plurality of guide slots directed into a bottom surface thereof and oriented so as to extend substantially parallel to the longitudinal axis of the base plate; and further comprising a pair of guide projections extending from the alignment member and received within an individual one of the guide slots so as to movably mount the alignment member along the lower surface of the base plate.

2. The power saw in combination with the alignment device of claim 1, wherein the spring return assembly comprises a spring housing mounted relative to the base plate; a spiral spring mounted within the spring housing, the spiral spring extending into the guide slot and being coupled to the guide projection residing within the respective guide slot, the spiral spring being tensioned so as to pull the alignment member towards the front end of the base plate.

3. The power saw in combination with the alignment device of claim 2, wherein the base plate is shaped so as to include an arcuate rear edge extending along the rearward end of the base plate, with the guide slots curving upwards proximal to the arcuate rear edge and terminating beneath an upper surface of the base plate such that the guide projection and the alignment member are permitted to swing about the arcuate rear edge so as to reside near the rearward end of the base plate.

4. The power saw in combination with the alignment device of claim 3, wherein the alignment member includes a plurality of gripping projections extending from a forward engaging surface thereof.

5. A power saw in combination with an alignment device comprising:

a base plate of substantially planar configuration which can be secured to an upper surface of a support deck of a power saw with a fastener and a base plate insert, the support deck having a rip guide attached thereto, the rip guide having a rip guide slot therein, the base plate insert being positioned within the rip guide slot and positioned adjacent the top of the support deck, the rip guide slot being capable of receiving the base plate insert therein, the base plate being substantially elongated in shape and including a forward end spaced from a rearward end with a longitudinal axis extending through the forward and stopping just before the rearward end thereof;

an alignment member movably mounted to a lower surface of the base plate and including an alignment member front face oriented so as to extend substantially orthogonally relative to the base plate; and a spring return assembly coupled to the base plate and to the alignment member so as to bias the alignment member towards the forward end of the base plate and allow movement towards the rearward end of the base plate, wherein the alignment member can be engaged to an edge of a board so as to orient a blade of the saw in a substantially orthogonal orientation relative to the edge of the board.

6. The power saw in combination with the alignment device of claim 5, wherein the base plate is shaped so as to define a plurality of guide slots directed into a bottom surface thereof and oriented so as to extend substantially parallel to the base plate; and further comprising a pair of guide projections extending from the alignment member and received within an individual one of the guide slots so as to movably mount the alignment member along the lower surface of the base plate.

7. The power saw in combination with the alignment device of claim 6, wherein the spring return assembly comprises a spring housing mounted relative to the base plate; a spiral spring mounted within the spring housing, the spiral spring extending into the guide slot and being coupled to the guide projection residing within the respective guide slot, the spiral spring being tensioned so as to pull the alignment member towards the front end of the base plate and tensioned so as to allow the alignment member to be pulled towards the rearward end of the base plate.

8. The power saw in combination with the alignment device of claim 7, wherein the base plate is shaped so as to include an arcuate rear edge extending along the rearward end of the base plate, with the guide slots curving upwards proximal to the arcuate rear edge and terminating beneath an upper surface of the base plate such that the guide projection and the alignment member are permitted to swing about the arcuate rear edge so as to reside near the rearward end of the base plate.

9. The power saw in combination with the alignment device of claim 8, wherein the alignment member includes a plurality of gripping projections extending from a forward engaging surface thereof.

* * * * *